United States Patent [19]

Foye et al.

[11] Patent Number: 4,910,236

[45] Date of Patent: Mar. 20, 1990

[54] PIGMENT PRODUCT

[75] Inventors: Thomas E. Foye; Edward K. Sasamoto, both of Holland, Mich.; Reinhard J. Sappok, Montclair, N.J.

[73] Assignee: BASF Corporation, Parsippany, N.J.

[21] Appl. No.: 145,119

[22] Filed: Jan. 19, 1988

Related U.S. Application Data

[63] Continuation-in-part of Ser. No. 941,785, Dec. 15, 1986, abandoned.

[51] Int. Cl.⁴ .................................................. C08L 3/02
[52] U.S. Cl. ..................................... 523/333; 523/334; 523/351; 523/352; 106/23; 106/262
[58] Field of Search ............... 523/333, 334, 351, 352; 106/23, 262

[56] References Cited

U.S. PATENT DOCUMENTS

| | | | |
|---|---|---|---|
| 4,535,151 | 8/1985 | Fournier | 106/23 |
| 4,595,417 | 6/1986 | Murakami | 106/262 |
| 4,634,471 | 1/1987 | Foye | 106/288 |
| 4,705,567 | 11/1987 | Hair | 106/23 |

Primary Examiner—Joseph L. Schofer
Assistant Examiner—Peter D. Mulcahy
Attorney, Agent, or Firm—Rupert B. Hurley, Jr.

[57] ABSTRACT

An ink is produced without flushing by forming both an emulsion of a selected organic liquid and water and an aqueous suspension of a pigment. The emulsion and the pigment are then mixed together, whereby the pigment is phase-transferred from the aqueous phase to the non-aqueous phase, and whereby a mixture is formed. The mixture is concentrated (e.g. via filtration) and added to an ink mixing tank where the remaining water is removed by evaporation and wherein the remaining ingredients are added so that the ink is produced.

14 Claims, No Drawings

PIGMENT PRODUCT

This is a continuation-in-part of application Ser. No. 941,785 filed Dec. 15, 1986, now abandoned.

BACKGROUND OF THE INVENTION

This invention relates to the production of printing ink.

A printing ink is conventionally made by charging the dry or flushed pigment into an ink mixing tank, adding additional components, mixing well and finishing the ink by either running the ink through a shot or bead mill and filtering, or over a roll mill and possibly filtering or simply filtering out of the mixing tank. In any event, it is essential that the pigment be uniformly dispersed in the vehicle.

The pigments used are usually formed at a low concentration (2-5 percent) in an aqueous suspension. These are then concentrated in a plate and frame filter press or by flocculation, flotation, or settling. The pigment in this concentrated form is generally referred to as presscake. There are many techniques for improving dispersibility of pigments such as adding the pigment in the form of a fine powder generally produced by drying in an oven or on a heated belt or in a spray dryer followed by grinding, preferably in a powder mill, and blending. Such process agglomerates the fine pigment particles formed upon synthesis. Many of the agglomerates cannot be broken down economically. Further, powdered pigments are difficult to redisperse to obtain maximum dispersion.

While conventional pigment presscake (i.e. presscake comprising greater than 50 percent water, based on weight of presscake) disperses more readily in an ink composition than dry pigment powders, nevertheless, due to the low solids content of the aqueous cake generally obtained by conventional processes, dispersion of untreated presscake in inks is not economically feasible because of the low pigment loading. Also, the amount of water carried by the conventional presscake into the oil ink presents problems. This water must be substantially removed during ink manufacturing. This removal process, in addition to considerably lengthening the manufacturing process time, is complicated by the effect of the emulsified water which disrupts the flow properties of these inks making handling and further processing difficult.

Accordingly, the pigment is often "flushed" to transfer the pigment particles from the aqueous phase to a non-polar oil or resin phase. This assists in keeping pigment particles non-agglomerated and easier to dilute for ultimate use in inks or coatings. Further, dusting is nonexistent using the flushed paste while it is usually extreme with dry pigments. Since the dry pigment has many agglomerates which cannot be broken down economically by subsequent dispersing equipment, inks from these are usually more opaque, less glossy, and more pigment is required to gain a unit amount of coloration (less color strength).

Flushing has been carried out for many decades by mixing pigment presscake with suitable types and quantities of "vehicles" which may be an oil, or a solution of resin or resins and other additives in a solvent. In the prior art, the transfer was effected by merely kneading the presscake and vehicle together until a major portion of the water has separated. Periodically the flushers have to be tilted to remove water as it breaks, i.e., becomes freed of pigment which has transferred to the oil base. However, flushing has the disadvantage of being time consuming and expensive. Accordingly, it is a purpose of the instant invention to produce a printing ink directly from a phase-transferred presscake and thus avoid the disadvantage of either dried or flushed pigments.

U.S. Pat. No. 4,230,610, issued Oct. 28, 1980, to Falcione et al, assigned to Calgon Corporation, discloses the use of polyacrylates as dispersants for aqueous magnesium oxide pigment slurries prior to dewatering. The polyacrylate is obtained by neutralizing poly(acrylic acid) to a pH of from about 8 to about 12 with bases such as sodium or ammonium hydroxide. This changes the solubilization process properties of the polyacrylic acid resin from oleophilic to hydrophilic.

SUMMARY OF THE INVENTION

In accordance with the instant invention, organic pigments are phase transferred from an aqueous to a non-aqueous phase, in discrete form, while still in the unconcentrated slurry through preferential wetting by surface contact between the pigment and a hydrophobic polymer solution emulsified in water. This material can then be concentrated in a plate and frame press or by flocculation, flotation or settling. After filtration, the resultant material ("a phase-transferred presscake") somewhat resembles conventional presscake but contains an organic phase as well as only 10 to 45 percent water whereas conventional presscake contains 55 to 90 percent water. This treatment is disclosed in U.S. Patent Application Ser. No. 728,236, now U.S. Pat. No. 4,634,471. However, in Ser. No. 728,236, the phase-transferred presscake is then subjected to a flushing process (i.e. the transfer of pigment from the aqueous phase to the oil phase was effected by kneading the presscake and vehicle together until a major portion of the water had separated, as described above). In contrast, the process of the present invention does not involve flushing. Rather, the instant process comprises adding the phase-transferred presscake to an ink mixing tank, followed by the evaporation of water from the ink mixing tank. The evaporation of water in the ink mixing tank stands in sharp contrast to the removal of water via flushing.

In accordance with the instant invention, the pigment product can be directly added to an ink mixing tank where other vehicles and oils are added to form an ink without drying and grinding or flushing. Surprisingly, the advantages of making an ink from a flushed product are maintained.

DESCRIPTION OF THE PREFERRED EMBODIMENTS

More specifically, this invention relates to a method of producing an ink by

A. providing an emulsion which comprises an aqueous phase and a non-aqueous phase, the aqueous phase comprising water and an emulsifying agent, the non-aqueous phase comprising an organic liquid selected from the group consisting of oleophilic resins, organic solvents, and mixtures thereof; and B. forming an aqueous suspension of a pigment; and C. mixing the emulsion with the aqueous pigment suspension whereby the pigment is phase-transferred from the aqueous phase to the non-aqueous phase and whereby a mixture is formed; and D. concentrating the mixture, whereby a concentrated mixture is formed; and E. adding the concentrated mixture to an ink mixing tank, the tank containing the additional ingredients needed to complete the ink; and F. evaporating substantially all of the water from the tank so that a substantially non-aqueous ink is formed without flushing.

In accordance with the instant invention, an oil in water emulsion is prepared by mixing an organic liquid selected from the group consisting of oleophilic resins, organic solvents and mixtures thereof, an emulsification agent, and water.

The emulsion comprises by weight about 50 to 90 percent water, 0 to about 40 percent resin, 0 to about 40 percent solvent and about 0.05 to 0.5 percent emulsification agent. While the emulsion may contain 0 percent of the resin or 0 percent of the solvent, it must contain at least about 2.0 percent by weight of either the resin or the solvent or mixture of both. A preferred emulsion contains 50 to 80 percent by weight water, 10 to 30 percent by weight resin, 10 to 30 percent by weight solvent, and 0.1 to 0.4 percent emulsification agent.

The resins employed are water-insoluble products of the type generally employed in the oil ink industry. More specifically, the resins may be oleophilic resins: drying and semi-drying oils, litho varnishes (bodied linseed oil), rosins, dimerized rosins and esters of dimerized rosins; maleic, fumeric and phenolic modified rosins and rosin esters; aliphatic and aromatic hydrocarbon resins: polyindenes, cumarone/indene resins, alkyl aromatic resins, alkyd resins, urethane or polyamide modified alkyds; polyolefins, phthalate esters, castor, fish and linseed oils; heatset and quickset vehicles used in the printing ink industry; oil soluble fatty acids such as oleic, linoleic, etc.

The solvents employed may be the common solvents generally employed in the water-insoluble oil ink industry such as mineral oil and aliphatic petroleum distillates.

The emulsification agent may be any agent capable of emulsifying the above resins and solvents in water. They can be anionic, cationic, nonionic or amphoteric surface active agents. More specifically, they may be any oil ink industry compatible emulsifier which produces stable oil-in-water emulsions when the oil phase is a resin or resins, solvent or solvents or a combination of the two as defined above. These surface active agents would include amine alkyl sulfonates, bis-tridecyl esters of sodium sulfosuccinic acid, block copolymers of ethylene oxide and propylene oxide as well as many others. Among the surface active agents which may be employed are the sodium salts of high molecular weight fatty alcohol sulfates, such as sodiumlauryl sulfate, sodium lignin sulfonates, the dioctyl ester of sodium sulfosuccinic acid, polyalkylene oxide condensation products, such as polyethylene oxides, quaternary ammonium salts, the sodium sulfonates of oleic acid esters of aliphatic compounds, sodium salts of aryl alkyl polyether sulfonates, and the like. Examples of suitable surfactants which are to be regarded as illustrative, and not as limiting, are given in Table I:

TABLE I

| No. | Chemical Class | Type | Trade Name | Percent Active |
|---|---|---|---|---|
| 1 | Sodium lauryl sulphate | Anionic | Duponol ME | 96 |
| 2 | Sodium dioctyl-sulfosuccinate | Anionic | Aerosol OT | 100 |
| 3 | Sodium salt of alkyl aryl polyether sulfate | Anionic | Triton 770 | 25 |
| 4 | Polyalkylene glycol ether | Nonionic | Tergitol XD | 100 |
| 5 | Polyoxyethylated castor oil | Nonionic | Emulphor EL 749 | 97 |
| 6 | Sodium alkylnaphthalene sulfonate | Anionic | Nekal BA 75 | 70 |

The emulsion is prepared by mixing in any conventional high shear mixing equipment such as a Cowles dissolver or a single blade mixer, a Banberry mill or a Gaullin homogenizer. The mixing may take place for a few minutes to several hours depending on the ultimate product desired.

An aqueous pigment suspension is then prepared by any known method.

This invention may be employed in conjunction with the production of many different pigments. Since the scientific nomenclature for dyes and pigments is very difficult, trade names are used almost exclusively in speaking of them. Examples of pigments for which this invention is applicable, identified by their recognized names followed by the Color Index or C.I. number in parenthesis, are the following:

Pigment Red 1 (12070), Pigment Red 3 (12120), Pigment Red 4 (12085), Pigment Red 48:1 (15865:1), Pigment Red 48:2 (15865:2), Pigment Red 48:3 (15865:3), Pigment Red 48:4 (15865:4), Pigment Red 49:1 (15630:1), Pigment Red 49:2 (15630:2), Pigment Red 53:1 (15585:1), Pigment Red 52 (15860:1), Pigment Red 57 (15850:1), Pigment Red 81 (45160:1), Pigment Red 190 (71145), Pigment Orange 13 (21110), Pigment Orange 19 (15990), Pigment Orange 46 (15602), Pigment Yellow 12 (21090), Pigment Yellow 13 (21100), Pigment Orange 16 (21160), Pigment Yellow 14 (21095), Pigment Yellow 17 (21105), Pigment Yellow 83 (21108), Pigment Green 7 (74Z60), Pigment Green 36 (74160), Pigment Blue 15:1, 15:2, 15:3 (74160), Pigment Blue 61 (42765:1).

An explanation of the well-known and well-used Color Index can be found on pages 20, 32, and 33 of *American Inkmaker* for January, 1984.

The emulsion and pigment suspension are then mixed using conventional mixing equipment such as described above with respect to the preparation of the emulsion. In general, the emulsion is added to the pigment strike liquor. The temperature of both the emulsion and pigment strike liquor will depend on the pigment employed. It should be the usual temperature at which the pigment slurry is concentrated and can range from 20° C. to 80° C. The emulsion should have a micelle size of about 0.1 to 5.0 microns but can range from 0.1 to 50 microns or larger. The mixing time after emulsion addition should be from about 15 minutes to two hours and the emulsion should be added during the first portion of this time period. A phase-transfer occurs during the mixing process. The pigment particles, initially within the aqueous phase, are phase-transferred into the non-aqueous phase. In addition, the mixing process forms a mixture. After mixing the pigment suspension with the emulsion, the composition will generally be as follows:

|   | Broad (%) | Preferred (%) |
|---|---|---|
| A. Water | 70–98.5 | 90–97.9 |
| B. Resin | 0–20 | .6–5 |
| C. Solvent | 0–20 | .6–5 |
| D. Emulsification Agent | 0.0015–.3 | 0.009–.05 |
| E. Pigment | 0.5–10 | 1.0–5.0 |

The mixture is then concentrated, preferably by forcing through a filter such as a plate and frame filter press. The resulting phase-transferred presscake generally comprises less than 25 percent (by weight) water, based on total presscake weight. This pigment product can be directly added to an ink mixing tank where other vehicles and oils would be added to form an ink.

Any of the hydrophobic organic vehicles that are commonly used in printing ink and coating compositions may be employed in the method and composition of this invention. Such vehicles are represented by drying, semi-drying, and non-drying oils, litho varnishes, mineral oils, rosins, dimerized rosins, esters of dimerized rosins, aliphatic and aromatic hydrocarbon resins, alkyl-aromatic resins, maleic and fumeric-modified rosin, phenolic resin, phenolic modified rosin esters, alkyd resins, urethane-modified alkyds, polyolefins, polyindenes, coumarone/indene resins, phthalate esters, castor oil, fish oil, linseed oil, gloss varnishes, and various heat-set, quick-set and steam-set vehicle systems.

The vehicle may be a solution of a resin or mixture of resins and other additives in a solvent.

Typical resins which can be advantageously employed in such solutions are illustrated in the following table:

TABLE II

| No. | Resin Type | Trade Name of Resin | Manufacturer |
|---|---|---|---|
| 1. | Isophthalic Alkyd based on Linseed Oil | AVO-791 | BASF |
| 2. | Polyamide Alkyd | Nylin 5 | Lawter |
| 3. | Phenolic Modified Rosin Ester of Abietic Acid | Beckacite 24-102 | Reichhold |
| 4. | Maleic Modified Rosin Ester of Abietic Acid | Filtrez 3790 | FRP |
| 5. | Pentaerythritol Ester of Dimeric Resin Acids | Pentalyn K | Hercules |
| 6. | Aliphatic Hydrocarbon | Piccovan AB165 | Hercules |
| 7. | Aromatic Hydrocarbon | LX-685-135 200 | Neville |
| 8. | Modified Hydrocarbon | Nevroz 14ZO | Neville |
| 9. | Aromatic-Aliphatic Hydrocarbon | Petrovez 200 | Lawter |

As solvent in the resin-solvent type vehicle there may be employed aliphatic hydrocarbons, including petroleum distillates having a boiling range of 200° C. to 375° C., petroleum solvents such as mineral spirits and VMP naptha, petroleum aromatic solvents, such as Solvesso No. 100, aromatic solvent having a boiling range 150° to 185° F. and a KB value of 91, aromatic solvents having a KB value of 92 to 100 such as xylene, and acyclic alcohols, ketones, and ethers, such as butanol, methyl isobutyl ketone, and "Methylcellosolve" (ethylene glycol monomethyl ether). The solvent mixtures will vary with the resins used and may be adjusted accordingly, but must be capable of dissolving the resin completely.

After addition of the concentrated mixture to the ink mixing tank, the water (which was within the concentrated mixture) is evaporated out of the ink tank. The evaporation of the water is carried out by heating the ingredients within the ink tank. Preferably, the ingredients are heated to a temperature of approximately 195° F.

Standard ink processing techniques of shot or bead milling and filtering or roll milling and filtering may then be used to produce an ink of commercial quality. The water carried by the pigment product is removed in the tank by ambient or vacuum evaporation or on the roll mill. No phase separation takes place which normally occurs if regular presscake is used similarly and would present a major problem.

The treated presscake product has advantages over both dry pigment and flushed color. Compared to dry pigment it has the same advantages of a flushed color, i.e., nondusting, more transparency, higher gloss and higher color strength. Versus flush pigment, its advantages lie in the manufacturing process. This material can go directly from presscake to ink tank, eliminating the time and energy consuming flushing process, without losing any transparency, gloss or color strength.

As specific embodiments and illustrative of the present invention, certain specific examples are set forth below. In the instant application all parts and percentages are by weight and all temperatures are in degrees Centigrade unless otherwise specified.

EXAMPLE 1

A dodecylbenzenesulfonic acid emulsifying agent in amount of 0.3 part was mixed in a stainless steel tank for five minutes with 90.0 parts of water using a high-speed Cowles sawtooth blade mixer. Thirty parts of vehicle A, a heatset vehicle, was then added. This comprised 14.1 parts of a hydrocarbon solvent sold under the trademark Magiesol 47, 6 parts of a #0 bodied alkyd resin, and 9.9 parts of an aromatic-aliphatic hydrocarbon resin sold under the trademark Petrorez 140.

The emulsion was mixed for 30 minutes at 165° F. using the high-speed Cowles sawtooth blade mixer. The average diameter of the micelles obtained was about 3 to 5 microns. This emulsion was then added to a 3 percent aqueous suspension containing 30.0 parts of a Lithol Rubine pigment (Pigment Red 57 C.I. No. 15850) over a 30 minute period while stirring. After stirring for one hour, the mixture was pumped to a diaphragm filter press where it was concentrated. The resultant unwashed presscake contained 22.0 percent water, 39.0 percent pigment and 39.0 percent vehicle A.

This pigment product was added directly to an ink mixing container using the following laboratory procedure:

1. Measure 75 grams of vehicle B, a Heatset ink containing 60.0 percent of an aromatic-aliphatic hydrocarbon resin, sold under the trademark of Petrorez 140, and 40.0 percent of a hydrocarbon solvent sold under the trademark Magiesol-47 into a 250 ml double walled container.
2. Vehicle B was heated to 195° F. and maintained at this temperature throughout the process.
3. At 8000 rpm, using a 20 mm cowles sawtooth blade mixer, the pigment product was slowly added in 5 to 10 gram quantities over a period of four hours whereby the total pigment added was 25 grams. The moisture from the pigment product was eliminated by evaporation.
4. After all the pigment product had been added, it was stirred for one hour.
5. The dispersion quality was checked on a 2 ml/NIPIRI grind gauge versus standard and found to be very slightly better.

The grind gauge test is described in ASTM D-1316-79 and can be found in the 1986 ASTM Standards in Section 6 Volume 06.01, pages 218–220.

The standard is a semi-finished ink at 20 percent pigment made by reducing a flushed paste sold by BASF Corporation under the designation 45-PP-0229 with conventional ink letdown vehicles by hand mixing on a glass plate.

6. The ink base was then let down with 117.5 grams of a heat set ink base vehicle and 7.5 grams of a hydrocarbon solvent sold under the trademark Magiesol-47.

The total composition is shown in Table I below.

TABLE I

| Pigment | 10 percent |
|---|---|
| Vehicle A | 10 percent |
| Vehicle B | 30 percent |
| Heat set ink base vehicle | 47.0 percent |
| Hydrocarbon solvent | 3.0 percent |

The above ink was compared to two heatset inks, one conventionally made from a flushed color, sold by BASF Corporation under the designation 45-PP-0229, of master standard quality at equal pigment amounts and the other conventionally made from a dry pigment sold by the BASF Corporation under the designation D-4566-DD of standard quality at equal pigment amount. The results of comparisons on each of the three inks is shown in Table I below using the product of the instant invention as a standard and comparing the flushed product and the dry pigment to that of this invention in the properties set forth in Table II.

TABLE II

| | Pigment Red 57 Evaluations | | | |
|---|---|---|---|---|
| Heatset Ink Type | Printone Intensity | Tinctorial Strength at Equal Pigment | Grind | Finish |
| Pigment Product of this Invention | Control | — | — | — |
| Flush Color BASF 45-PP-0229 | Equal | Equal | Very slightly better | Equal |
| Dry Pigment BASF D-4566-DD | Equal | 15% weak | Much worse | Very slightly less |

The evaluations demonstrate that the pigment product of this invention outperforms dry pigment and closely resembles a heatset ink of flush color quality. Thus, this demonstrates that by employing the process of this invention, a printing ink of flush color quality can be produced without the time and expense involved in the flushing procedure.

The printone intensity test was conducted as follows:

The test and standard inks were tack adjusted on a tackometer (a procedure familiar to those skilled in the art of inkmaking), then printed side by side on a Little Joe TM hand operated printing press. The print is then dried by passing it through a Sinvatrol TM print drying oven.

A subjective visual comparison is then made of the color intensity of the two side by side ink films.

The tinctorial strength at equal pigment amount test was conducted as follows:

5 grams of tint bleach made from 40 percent zinc oxide and 60 percent Lawter's Thermex A6EXL is mixed by hand on a glass plate with an amount of the test ink equivalent to 30 milligrams of pigment. The same procedure is followed for the standard ink. The two tints are compared for color intensity (tint strength). If the tint strength is not equal, the test ink tint is then made again varying the level of pigment until the tint strength is equal. The tint strength value is then the percentage difference in pigment amount between the test and standard inks.

The grind test was conducted as described above. The finish test was conducted as follows:

The procedure to make the prints is the same as the printone intensity test. After the side by side prints are made, the amount of incident or reflected light from a point source is observed visually at a 60° angle to the print. The subjective visual difference in the amount of reflected light between the test and standard ink films is measured. The greater the amount of reflected light, the greater the finish.

Example 2

The procedure of Example 1 was applied to a 3 percent aqueous pigment suspension containing 30.0 parts of pigment Yellow 12 (C.I. No. 21090) at 100° F. to produce a heat set ink directly from said pigment product. Comparisons of this product with one made from a flushed color, sold by the BASF Corporation under the designation 12-PP-0220, of master standard quality and one made from a dry pigment, sold by the BASF Corporation under the designation NBD-1442, of master standard quality are set forth in Table III below.

TABLE III

| | Pigment Yellow 12 Evaluations | | | |
|---|---|---|---|---|
| Heatset Ink Type | Printone Intensity | Tinctorial Strength at Equal Pigment | Grind | Finish |
| Pigment Product of this Invention | Control | — | — | — |
| Flush Color BASF 12-PP-0220 | Equal | 6% strong | Much worse | Slightly more |
| Dry Pigment BASF NBD-1442 | Equal | 83% weak | Much worse | Much less |

Again, the above evaluations demonstrate that the pigment product of this invention compares closely to a flush color quality and is greatly superior to a dry pigment and yet the flushing step has been eliminated.

The embodiments of the invention in which an exclusive privilege or property is claimed are defined as follows:

1. A method of producing an ink, comprising:
   A. providing an emulsion which comprises an aqueous phase and a non-aqueous phase, the aqueous phase comprising water and an emulsification agent, the non-aqueous phase comprising an organic liquid selected from the group consisting of oleophilic resins, organic solvents, and mixtures thereof,
   B. forming an aqueous suspension of a pigment,
   C. mixing the emulsion with the aqueous pigment suspension whereby the pigment is phase-transferred from the aqueous phase to the non-aqueous phase and whereby a mixture is formed, the mixture comprising at least 70 weight percent, based on pigment, of the non-aqueous phase,
   D. concentrating the mixture whereby a concentrated mixture is formed,
   E. adding the concentrated mixture to an ink mixing tank, the tank containing the additional ingredients needed to complete the ink, and F. evaporating substantially all of the water from the tank so that a substantially non-aqueous ink is formed without flushing.

2. The process of claim 1 wherein the organic liquid is an oleophilic resin.

3. The process of claim 1 wherein the organic liquid is an organic solvent.

4. The process of claim 1 wherein the concentrating is performed by forcing the mixture through a concentration zone.

5. The process of claim 4 wherein the concentration step is performed in a filter press.

6. The process of claim 5 wherein the organic liquid is an oleophilic resin.

7. The process of claim 5 wherein the organic liquid is an organic solvent.

8. The process of claim 5 wherein the emulsion and aqueous pigment suspension are mixed for about 0.25 hour to 2 hours at about 20° to 80° C. and the emulsion comprises about 50 to 90 percent water, 0 to about 40 percent of the resin, 0 to about 40 percent of the solvent, and about 0.05 to 0.5 percent of the emulsification agent, the emulsion containing a minimum of 2.0 percent of the resin or the solvent or mixture of both.

9. The process of claim 8 wherein the organic liquid is an oleophilic resin in an amount of about 10 to 30 percent by weight.

10. The process of claim 7 wherein the organic liquid is an organic solvent in an amount of about 10 to 30 percent by weight.

11. The process of claim 7 wherein the emulsion pigment suspension mixture prior to passage through the concentration zone comprises about 70 to 98.5 percent water, 0 to about 20 percent resin, 0 to about 20 percent solvent, about 0.0015 to 0.3 percent emulsification agent and about 0.5 to 10 percent pigment, the composition containing at least about 2.0 percent by weight of the resin or the solvent or mixture of both.

12. The process of claim 11 wherein the organic liquid is an oleophilic resin.

13. The process of claim 11 wherein the organic liquid is an organic solvent.

14. The process of claim 11 wherein the organic liquid is a mixture of an oleophilic resin and an organic solvent.

* * * * *